United States Patent
Paulsen

(10) Patent No.: US 11,736,366 B2
(45) Date of Patent: Aug. 22, 2023

(54) REMOTE GUI FOR SIMPLE NETWORK DEVICES

(71) Applicant: Silicon Laboratories Inc., Austin, TX (US)

(72) Inventor: Olfert Paul Paulsen, Dragør (DK)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/070,419

(22) Filed: Oct. 14, 2020

(65) Prior Publication Data
US 2022/0116282 A1 Apr. 14, 2022

(51) Int. Cl.
*H04L 41/22* (2022.01)
*G06F 3/0482* (2013.01)
*G06F 9/451* (2018.01)
*H04L 67/75* (2022.01)

(52) U.S. Cl.
CPC ............ *H04L 41/22* (2013.01); *G06F 3/0482* (2013.01); *G06F 9/452* (2018.02); *H04L 67/75* (2022.05)

(58) Field of Classification Search
CPC ....... H04L 41/22; H04L 67/36; G06F 3/0482; G06F 9/452
See application file for complete search history.

(56) References Cited

U.S. PATENT DOCUMENTS

| 2015/0319046 A1* | 11/2015 | Plummer | ............ H04L 12/2834 715/736 |
| 2017/0126841 A1* | 5/2017 | Bliss | .................. G05B 19/0423 |
| 2019/0012142 A1* | 1/2019 | Bang | .................. G06F 3/04883 |

OTHER PUBLICATIONS

Tutorialrepublic, HTML, p. 1-5, Wayback Machine date: Aug. 14, 2020; https://web.archive.org/web/20200814084810/https://www.tutorialrepublic.com/html-tutorial/html-forms.php (Year: 2020).*

* cited by examiner

*Primary Examiner* — Andrey Belousov
(74) *Attorney, Agent, or Firm* — Nields, Lemack & Frame, LLC

(57) ABSTRACT

A system and method for allowing a companion device to serve as a user interface for another network device is disclosed. The companion device includes a display element, an input device and a software program that enables the companion device to create standard graphical items on that display. The network device transmits a list of graphical descriptors to the companion device, which the companion device uses to create the user interface. Additionally, the network device also transmits to the companion device, the commands that the companion device is to transmit based on user input. In this way, the companion device does not require any knowledge of the operation or functionality of the network device in order to serve as its user interface.

16 Claims, 10 Drawing Sheets

| BUTTON 500 | TYPE 501 | LABEL 502 | COMMAND FOR FIRST BUTTON POSITION 503 | COMMAND FOR SECOND BUTTON POSITION 504 |
|---|---|---|---|---|

| BUTTON 500 | TYPE 501 | LABEL 502 | COMMAND FOR FIRST BUTTON POSITION 503 | COMMAND FOR SECOND BUTTON POSITION 504 |

FIG. 5A

| SLIDER 510 | MINIMUM VALUE 511 | MAXIMUM VALUE 512 | GRANULARITY 513 | LABEL 514 | COMMAND FOR SLIDER 515 |

FIG. 5B

| INPUT BOX 520 | FORMAT 521 | LABEL 522 | COMMAND FOR INPUT BOX 523 |

FIG. 5C

| DISPLAY BOX 530 | FORMAT 531 | LABEL 532 | DATA FOR DISPLAY BOX 533 |
|---|---|---|---|

FIG. 5D

| GAUGE 540 | MINIMUM VALUE 541 | MAXIMUM VALUE 542 | GRANULARITY 543 | LABEL 544 | DATA FOR GAUGE 545 |
|---|---|---|---|---|---|

FIG. 5E

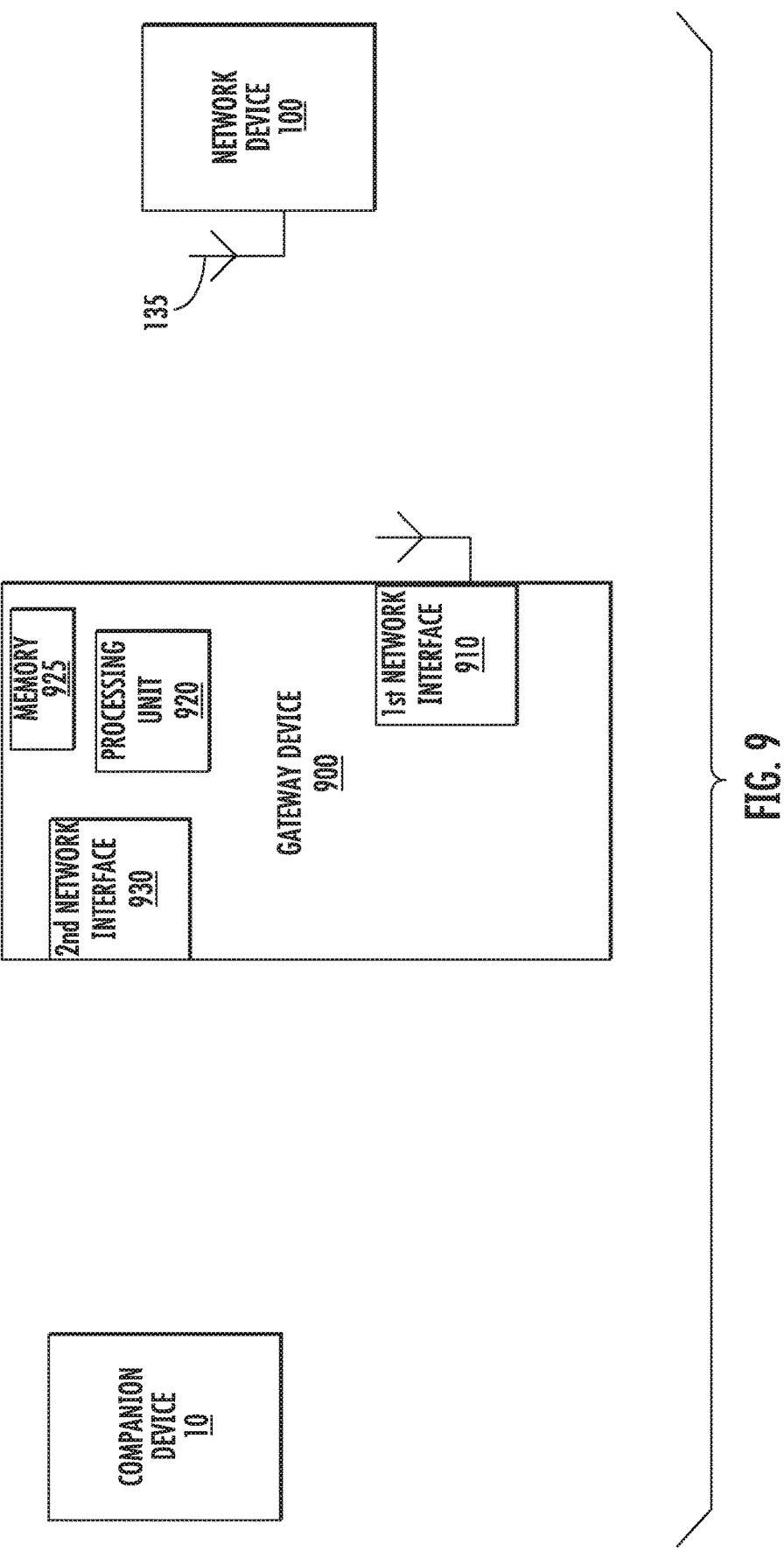

REMOTE GUI FOR SIMPLE NETWORK DEVICES

This disclosure describes systems and methods allowing the use of a companion device to serve as the user interface for a simple network device.

BACKGROUND

The explosion of network connected devices has led to an increased use of certain wireless protocols. For example, simple wireless network devices are being implemented as temperature sensors, humidity sensors, pressure sensors, motion sensors, cameras, light sensors, dimmers, light sources, and other functions. Additionally, these wireless network devices have become smaller and smaller.

As these network devices become smaller and simultaneously more complex, the issues associated with configuring them becomes problematic. In these small devices, there is a limited or non-existent user interface to enable the user to set up the network device.

Additionally, the ability to debug these network devices, especially when they are deployed in large networks, is also troublesome.

Therefore, it would be advantageous if there were a system and method to allow another device, known as a companion device, to operate as the user interface for the network device. Further, it would be beneficial if the companion device did not require any knowledge of the network device in order to serve as its user interface.

SUMMARY

A system and method for allowing a companion device to serve as a user interface for another network device is disclosed. The companion device includes a display, an input device, and a software program that enables the companion device to create standard graphical items on that display. The network device transmits a list of graphical descriptors to the companion device, that the companion device uses to create the user interface. Additionally, the network device also transmits to the companion device, the commands that the companion device is to transmit based on user input. In this way, the companion device does not require any knowledge of the operation or functionality of the network device in order to serve as its user interface.

According to one embodiment, a method for using a companion device to serve as a user interface for a network device is disclosed. The method comprises transmitting, from the network device to the companion device, a list of graphical descriptors, wherein each graphical descriptor includes a field that denotes a standard graphical item; displaying the standard graphical items on a display element on the companion device, wherein a software program used to display the standard graphical item is preloaded in the companion device; accepting user input at the companion device; and performing an action in response to the user input. In some embodiments, the action comprises issuing a command to the network device in response to the user input. In certain embodiments, the standard graphical items are selected from the group consisting of button, slider, input box, display box and gauge. In certain embodiments, each graphical descriptor comprises a set of associated parameters and one or more of the associated parameters provide information regarding how the standard graphical item is to be displayed by the companion device. In some embodiments, each graphical descriptor comprises a set of associated parameters and at least one of the standard graphical items is used to provide data to the network device, and one or more of the associated parameters comprises commands that the companion device is to issue to the network device if the at least one standard graphical item is actuated. In certain embodiments, each graphical descriptor comprises a set of associated parameters and at least one of the standard graphical items is used to provide data to a user, and one or more of the associated parameters comprises data that the companion device is to display on the display element. In some embodiments, a gateway device is disposed between the network device and the companion device such that all communications between the companion device and the network device pass through the gateway device.

According to another embodiment, a companion device for use with a network device to serve as a user interface for the network device is disclosed. The companion device comprises a network interface; a display element; an input device; a processing unit; and a memory device in communication with the processing unit, comprising instructions, which when executed by the processing unit, enable the companion device to: receive a list of graphical descriptors from a network device, wherein each graphical descriptor includes a field that denotes a standard graphical item; display the standard graphical items on the display element; receive user input in response to the standard graphical items; and perform an action based on the user input. In certain embodiments, the action comprises issuing a command to the network device in response to the user input. In some embodiments, the standard graphical items are selected from the group consisting of button, slider, input box, display box and gauge. In some embodiments, each graphical descriptor comprises a set of associated parameters. In some embodiments, one or more of the associated parameters provide information regarding how the standard graphical item is to be displayed on the display element by the companion device. In some embodiments, at least one of the standard graphical items is used to provide data to the network device, and one or more of the associated parameters comprises commands that the companion device is to issue to the network device if the at least one standard graphical item is actuated. In certain embodiments, at least one of the standard graphical items is used to provide data to a user, and one or more of the associated parameters comprises data that the companion device is to display on the display element.

According to another embodiment, a network device for use with a companion device that serves as a user interface for the network device is disclosed. The network device comprises a network interface; a processing unit; and a memory device in communication with the processing unit, comprising instructions, which when executed by the processing unit, enable the network device to: transmit a list of graphical descriptors to the companion device, wherein each graphical descriptor includes a field that denotes a standard graphical item and wherein the companion device displays the standard graphical items on a display element such that user input may be entered; and receive a command from the companion device based on the user input. In some embodiments, the standard graphical items are selected from the group consisting of button, slider, input box, display box and gauge. In some embodiments, each graphical descriptor comprises a set of associated parameters. In certain embodiments, one or more of the associated parameters provide information regarding how the standard graphical item is to be displayed on the display element by the companion device. In some embodiments, at least one of the standard graphical items is used to provide data to the network device, and one or more of the associated parameters comprises commands that the companion device is to issue to the network device if the at least one standard graphical item is actuated. In some embodiments, at least one of the standard graphical items is used to provide data to a user, and one or more of the associated parameters comprises data that the companion device is to display on the display element.

BRIEF DESCRIPTION OF THE DRAWINGS

For a better understanding of the present disclosure, reference is made to the accompanying drawings, in which like elements are referenced with like numerals, and in which:

FIG. 5A-5E show the format of five graphical descriptors, one for each standard graphical item;

FIG. 9 shows another embodiment where a gateway device is also utilized.

DETAILED DESCRIPTION

Figure 1:
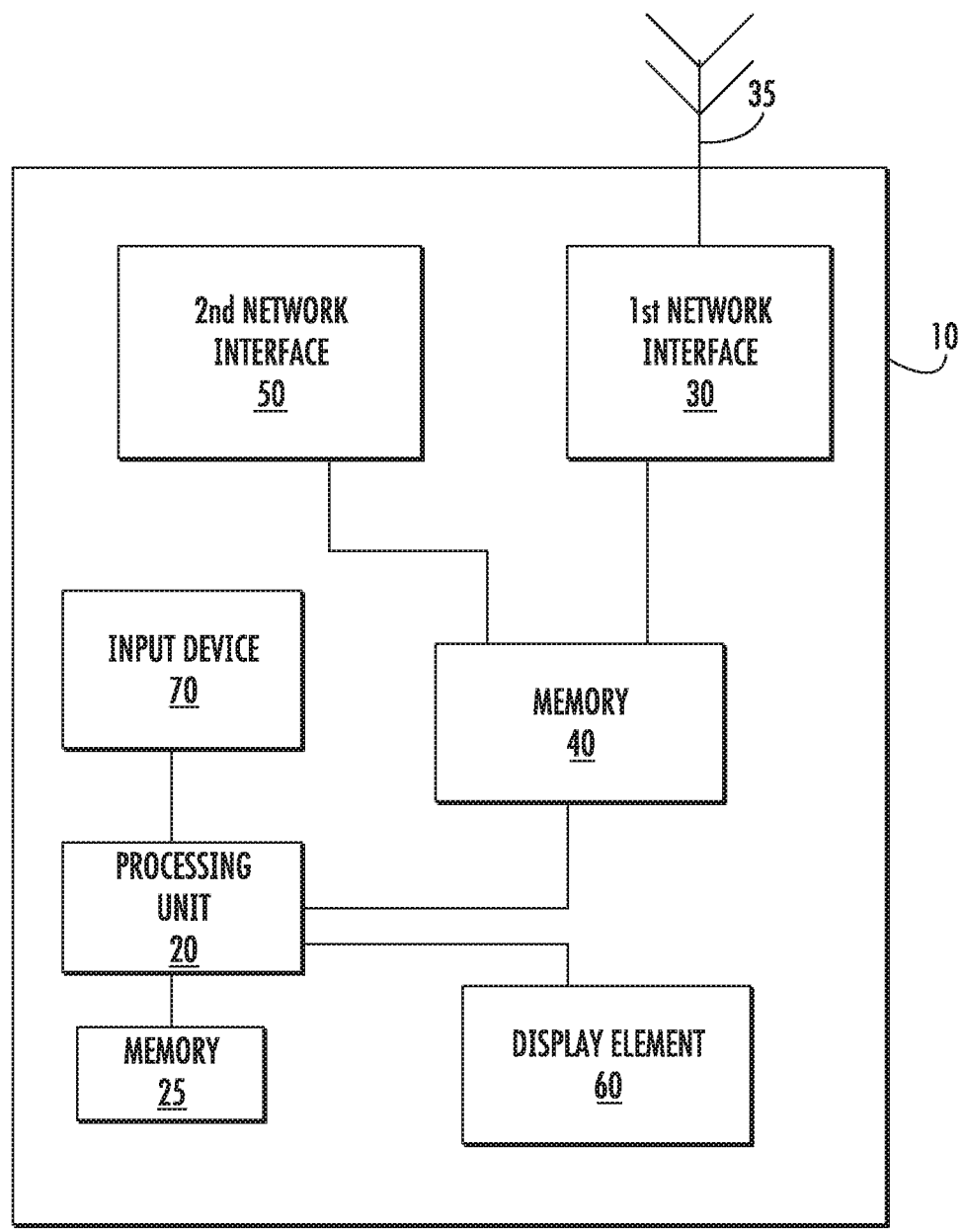
FIG. 1 is a block diagram of the companion device.

FIG. 1 shows a block diagram of a representative companion device 10. The companion device 10 has a processing unit 20 and an associated memory device 25. This memory device 25 contains the instructions, which, when executed by the processing unit 20, enable the companion device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

The companion device 10 also includes a first network interface 30, which is typically a wireless interface including an antenna 35. The first network interface 30 may support any wireless network, including ZIGBEE®, Thread, Z-Wave, BLUETOOTH® or other protocols. In certain embodiments, the companion device 10 may include a second network interface 50, different from the first network interface 30. This second network interface 50 may support any wireless or wired network, including a cellular protocol, such as 3G, GCM, CDMA, 4G, LTE, or other protocols, such as, for example, IP.

The companion device 10 may include a second memory device 40 in which data that is received by the first network interface 30, and data that is to be transmitted by the first network interface 30, is stored. Additionally, data sent and received by the second network interface 50 may be stored in the second memory device 40. This second memory device 40 is traditionally a volatile memory. The processing unit 20 has the ability to read and write the second memory device 40 so as to communicate with the other devices in the network. Although not shown, the companion device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the companion device 10. The instructions contained on this second computer readable media may be downloaded onto the memory device 25 to allow execution of the instructions by the companion device 10.

The companion device 10 also includes a display element 60 and an input device 70. In some embodiments, the display element 60 may be a LED or LCD screen. In certain embodiments, the display element 60 is a touch screen so that input may be supplied to the processing unit 20 through the display element 60. In other words, in some embodiments, the display element 60 and the input device 70 may be the same component. In other embodiments, the companion device 10 may be in communication with a separate input device 70 to allow user entry. The input device 70 may be a keyboard or a mouse, for example.

Any device that includes the components enumerated above may be used as the companion device. In one specific embodiment, the companion device 10 may be a mobile telephone or tablet computer. In certain embodiments, the instructions described herein may be packaged as an application. The companion device 10 may receive the application from a remote server. For example, in one embodiment, an application may be made available on a remote server, such as a corporate server. In certain embodiments, the application may be available on a digital distribution platform, such as Google Play, Microsoft Store, the Apple App Store and others. In other embodiments, the software may be pre-loaded onto the companion device 10.

Figure 2:
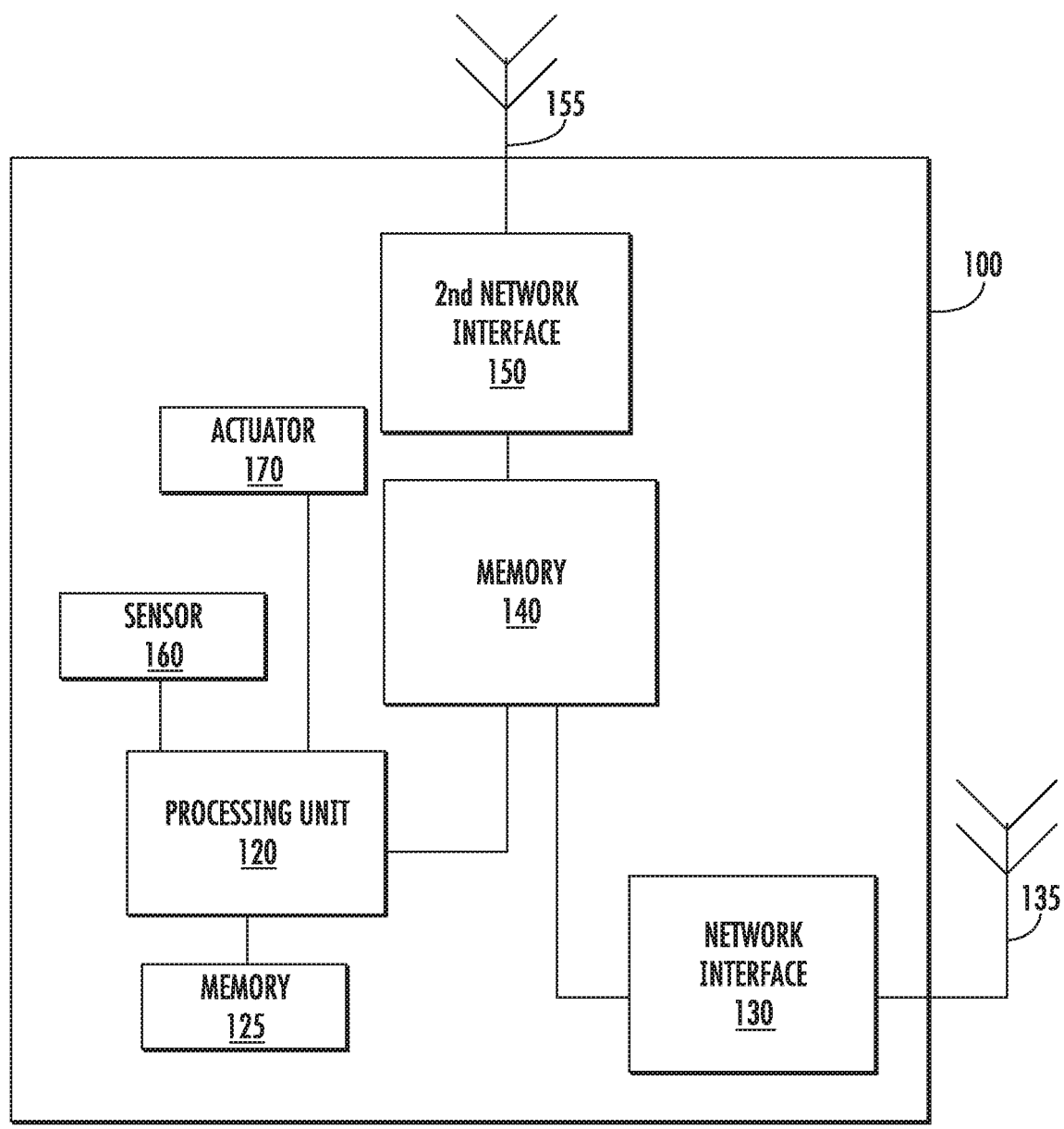
FIG. 2 is a block diagram of a network device.

FIG. 2 shows a block diagram of a representative network device. The network device 100 has a processing unit 120 and an associated memory device 125. The processing unit 120 may be any suitable device, such as a microprocessor, an embedded controller, or an application specific device. The memory device 125 contains the instructions, which, when executed by the processing unit 120, enable the network device 100 to perform the functions described herein. This memory device 125 may be a non-volatile memory, such as a FLASH memory, an electrically erasable ROM or other suitable devices. In other embodiments, the memory device 125 may be a volatile memory, such as a RAM or DRAM.

The network device 100 may also include a network interface 130. This network interface 130 may support a wireless network, such as ZIGBEE® or another wireless network protocol. The network interface 130 may include an antenna 135. The network interface 130 is used to communicate with one or more devices that are part of the local wireless network.

In certain embodiments, the network device 100 may also include a second network interface 150, which may be a wireless interface including an antenna 155. This second network interface 150 may be used to connect to the companion device 10. In certain embodiments, the second network interface 150 may be a Bluetooth network interface. In other embodiments, the network device 100 communicates with the companion device 10 using the network interface 130.

The network device 100 may include a second memory device 140 in which data that is received by the network interface 130, and data that is to be transmitted by the network interface 130, is stored. This second memory device 140 is traditionally a volatile memory. The processing unit 120 has the ability to read and write the second memory device 140 so as to communicate with the other nodes in the network.

The network device 100 may also include a sensor 160 and/or an actuator 170. The sensor 160 may provide information regarding a characteristic, such as pressure, light, or temperature. The actuator 170 may control some mechanism, such as a light or audio device, for example. Although not shown, the network device 100 also has a power supply, which may be a battery or a connection to a permanent power source, such as a wall outlet.

While a memory device 125 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 125, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 120, as shown in FIG. 2. The second computer readable media may be a CDROM, or a different memory device, which is located remote from the network device 100. The instructions contained on this second computer readable media may be downloaded onto the memory device 125 to allow execution of the instructions by the network device 100.

Note that the network device 100 may not include a user interface. Therefore, it may be difficult to provide the network device 100 with operating parameters or to retrieve information from the network device 100.

However, the present disclosure describes a system and method to overcome this problem.

For example, the network device 100 may have various settings that need to be provided by an operator. For example, the network device 100 may need to be provided with the name of the network which it is to be connecting to. In certain embodiments, the network device 100 may need to be provided with a passkey. In certain embodiments, it may be desirable to name the network device 100.

In addition to settings associated with the network configuration, there may be device specific parameters that need to be entered.

For example, for an actuator 170, such as a lighting device, there may be a default state (on or off), a default color, and a default brightness that need to be provided to the network device 100. Similarly, for an audio device, there may be a default state (mute or active) and a default volume.

For a sensor 160, it may be beneficial to be able to query the sensor 160 as to its current or historical readings. This may be very advantageous for debug and maintenance purposes.

However, as noted above, the network device 100 typically lacks a user interface and is without a display or input device. However, as described above, the companion device 10 includes a display element 60 and an input device 70. Thus, the companion device 10 may be used as the user interface for the network device 100.

However, customizing a companion device to operate with a particular network device 100 is inefficient. Further, loading the user interface for all possible network devices 100 onto a single companion device 10 is impractical and prone to constant updates as existing network devices are upgraded and new network devices are introduced.

Advantageously, the present disclosure describes a system and method whereby a companion device 10 may be used as the user interface for a network device 100 without having to possess any prior knowledge of that network device 100.

Specifically, the various parameters and data associated with the network device 100 can be entered and transmitted from the companion device 10 using a plurality of standard graphical items.

One such standard graphical item is a button, which may be depicted as a toggle switch or as an on/off switch. This graphical item is useful when the parameter of interest has exactly two states.

A second such standard graphical item is a slider, which may be useful when the parameter of interest has a plurality of possible values.

A third such standard graphical item is an input box, which may be used by the operator to enter text.

A fourth such standard graphical item is a display box, which can be used to display information from the network device 100, typically in text form.

A fifth such standard graphical item is a gauge, which can be used to display information from the network device 100 in graphical form.

Thus, if the companion device 10 has a display, such as a touchscreen or LED output, the companion device 10 may be used to create the user interface for the network device 100 based on these standard graphical items.

For example, the companion device 10 may include a software program. This software program includes the instructions needed to display each of these standard graphical items on its display element 60. In other words, the companion device 10 comprises a software program, which when provided with the type of standard graphical item, is able to create and display this item on the display element 60. By utilizing a predetermined number of standard graphical items, it is possible to embed this functionality in the software program contained in the companion device 10. This program may be pre-loaded in the companion device 10 and is not transmitted to the companion device 10 by the network device 100. The software program may also have the ability to scale these standard graphical items, based on the size of its display element 60 and the number of standard graphical items that are to be presented. Further, the software program also accepts inputs from the network device 100, as explained in more detail below. The software program also transmits commands to the network device 100.

Figure 3:
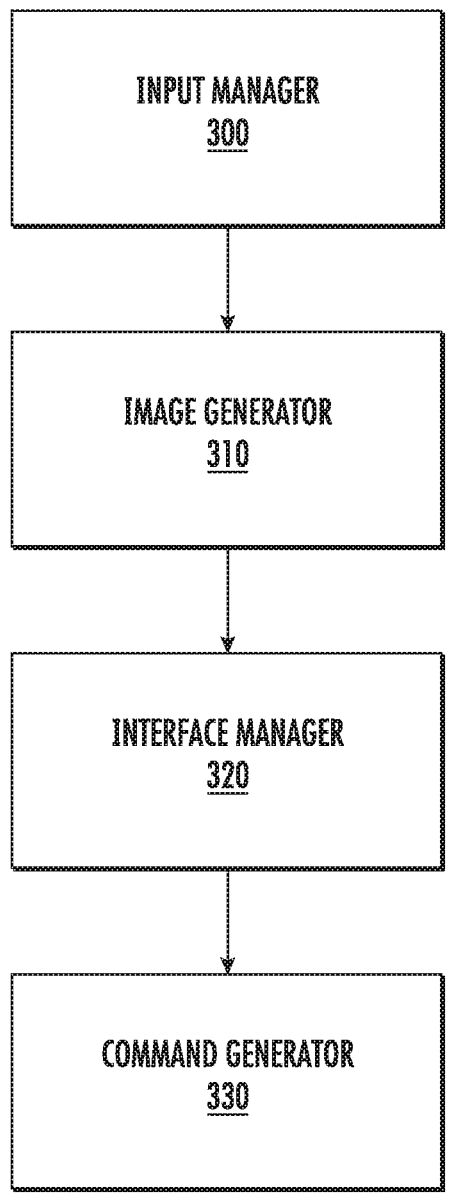
FIG. 3 shows the components of the software program in the companion device.

Specifically, the software program in the companion device 10 includes the following components, which are shown in FIG. 3:

Input Manager 300 to receive input and data from the network device 100;

Image Generator 310 to display standard graphical items, using a limited number of parameters provided by the network device;

Interface Manager 320 to receive input and data from the display element and/or the input device 70; and Command Generator 330 to transmit commands to the network device 100.

Figure 4:
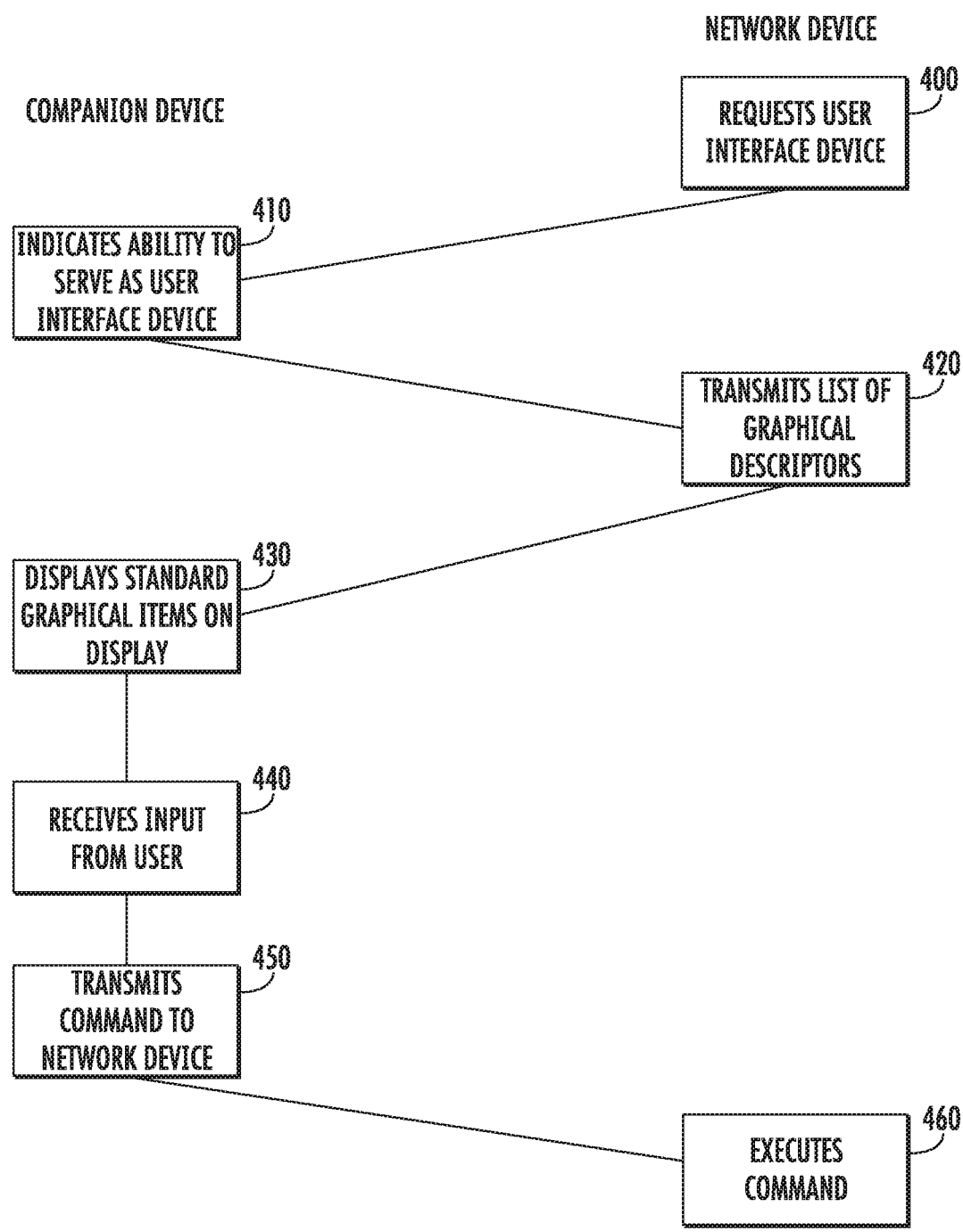
FIG. 4 shows a network device and a companion device during operation according to one embodiment.

FIG. 4 shows a sequence wherein the companion device 10 is used to serve as the user interface for a network device 100. In one embodiment, the data transmitted in Boxes 400-420 and Box 450 may be implemented using vendor unique commands.

First, as shown in Box 400, the network device 100 may determine that another device is nearby. In response, the network device 100 may transmit an inquiry, indicating that it is seeking a companion device 10 to serve as its user interface.

In response to this inquiry, the companion device 10 may respond that it is capable of serving as the user interface for the network device 100, as shown in Box 410.

Box 400 indicates that the network device 100 initiates this interaction. However, in another embodiment, the companion device 10 may initiate the interaction by indicating its ability to serve as a user interface for the network device 100. In response, the network device 100 may indicate that it is indeed seeking a companion to serve as its user interface. Thus, the interaction shown in Boxes 400-410 may occur in the opposite order, where the companion device 10 first indicates its ability to act as a user interface, and the network device 100 responds to this.

This interaction may occur during the provisioning of the network device 100. This interaction may be performed by the Input Manager 300.

Subsequently, the network device 100 may provide a list of graphical descriptors that may be used as the user interface for this device, as shown in Box 420. This list is accepted by the Input Manager 300 (see FIG. 3).

A graphical descriptor is a construct that is used to define an element that is to be displayed on the display element 60 of the companion device 10. These graphical descriptors may be transmitted using vendor unique commands, or in some other manner.

Each graphical descriptor includes a field that denotes the standard graphical item to be displayed. Additionally, there are one or more attributes that further define the standard graphical item. In certain embodiments, the graphical descriptor includes data that is to be displayed by the standard graphical item. In certain embodiments, the graphical descriptor includes commands that are to be issued to the network device 100 when the standard graphical item is actuated.

Five different graphical descriptors are described below, one for each standard graphical item. However, in other embodiments, fewer or more standard graphical items may be defined. As noted above, for each of these graphical descriptors, there is a field which defines the type of standard graphical item that is to be displayed. However, the network device 100 does not provide any information or data regarding the actual code needed to create this graphical item. Rather, the companion device 10 already includes the code and data necessary to display each of these standard graphical items on the display element 60. Thus, the field that is used to define the standard graphical item may be small, such as less than or equal to 4 bytes. In certain embodiments, this field may be one byte or two bytes.

FIG. 5A shows the graphical descriptor associated with a button, according to one embodiment. The first parameter indicates the type of standard graphical item, which, in this case is a button 500. The second parameter may be used to indicate the type 501 of button. For example, the button may be drawn as a push button or as a toggle switch. This field may also be small, such as less than four bytes. The third parameter may be the label 502 that is to be associated with this button. This may be a descriptive word that defines the function of the button. Note that the first three parameters are used by the Image Generator 310 to display the standard graphical item on the display element 60. In other words, the companion device 10 comprises instructions, which when provided with the type of standard graphical item, the type of button and the label, are able to display the desired button on the display element 60.

The next two parameters include the commands that the companion device 10 is to send to the network device 100 when the button is in the first position 503 and in the second position 504, respectively.

FIG. 5B shows the graphical descriptor associated with a slider, according to one embodiment. The first parameter indicates the type of standard graphical item, which, in this case is a slider 510. The second parameter may be used to indicate the minimum value 511 that the slider may be. The third parameter may be used to indicate the maximum value 512 that the slider may be. The fourth parameter may indicate the granularity 513 of the slider. The fifth parameter may be the label 514 that is to be associated with this slider. This may be a descriptive word that defines the function of the slider. Note that the first five parameters are used by the Image Generator 310 to display the standard graphical item on the display element 60. In other words, the companion device 10 comprises instructions, which, when provided with the type of standard graphical item, the minimum value, the maximum value, the granularity and the label, are able to display the desired slider on the display element 60.

The next parameter includes the command 515 that the companion device 10 is to issue to the network device 100 when the slider is modified. The command 515 may include the value of the slider as a parameter to the network device 100.

FIG. 5C shows the graphical descriptor associated with an input box, according to one embodiment. The first parameter indicates the type of standard graphical item, which, in this case is an input box 520. The second parameter may be used to indicate the format 521 of the input box. This may include the number of lines or a character count that the input box contains. The third parameter may be the label 522 that is to be associated with this input box. This may be a descriptive word that defines the function of the input box. Note that the first three parameters are used by the Image Generator 310 to display the standard graphical item on the display element 60. In other words, the companion device 10 comprises instructions, which, when provided with the type of standard graphical item, the format of the input box and the label, are able to display the desired input box on the display element 60.

The next parameter includes the command 523 that the companion device 10 is to send to the network device 100 when the input box is modified. The command may include the text contained in the input box as a parameter to the network device 100.

The commands shown in FIGS. 5A-5C may instruct the network device 100 to store a value in its memory. For example, the information associated with the button, slider or input box may be related to configuration parameters, which the network device 100 may store and use throughout its operation. Thus, in some embodiments, these commands may be used to set initialization or configuration parameters.

FIG. 5D shows the graphical descriptor associated with a display box, according to one embodiment. The first parameter indicates the type of graphical item, which, in this case is a display box 530. The second parameter may be used to indicate the format 531 of the display box. This may include the number of lines or a character count that the input box contains. The third parameter may be the label 532 that is to be associated with this display box. This may be a descriptive word that defines the function of the display box. The next parameter includes the data 533 that the companion device is to display in the display box. Note that the all of these parameters are used by the Image Generator 310 to display the standard graphical item on the display element 60. In other words, the companion device 10 comprises instructions, which, when provided with the type of standard graphical item, the format, the label, and the data, are able to display the desired display box on the display element 60.

FIG. 5E shows the graphical descriptor associated with a gauge, according to one embodiment. The first parameter indicates the type of standard graphical item, which, in this case is a gauge 540. The second parameter may be used to indicate the minimum value 541 that the gauge may be. The third parameter may be used to indicate the maximum value 542 that the gauge may be. The fourth parameter may indicate the granularity 543 of the gauge. The fifth parameter may be the label 544 that is to be associated with this gauge. This may be a descriptive word that defines the function of the gauge.

The next parameter includes the data 545 that the companion device is to display in the gauge. Note that the all of these parameters are used by the Image Generator 310 to display the standard graphical item on the display element 60. In other words, the companion device 10 comprises instructions, which, when provided with the type of standard graphical item, the minimum value, the maximum value, the granularity, the label and the data, are able to display the desired gauge on the display element 60.

Thus, for each graphical descriptor, one or more of the associated parameters are used by the companion device 10 to determine how to display the standard graphical item on the display element 60. Further, for certain standard graphical items, one or more of the associated parameters comprise the command which the companion device 10 is to issue to the network device 100 if that standard graphical item is actuated.

Further, although FIGS. 5A-5E show the format of various graphical descriptors, it is understood that other formats may be used to convey the information to the companion device 10.

Returning to FIG. 4, after receiving the list from the network device 100, the companion device 10 may display these standard graphical items on the display element 60, as shown in Box 430.

Figure 6:
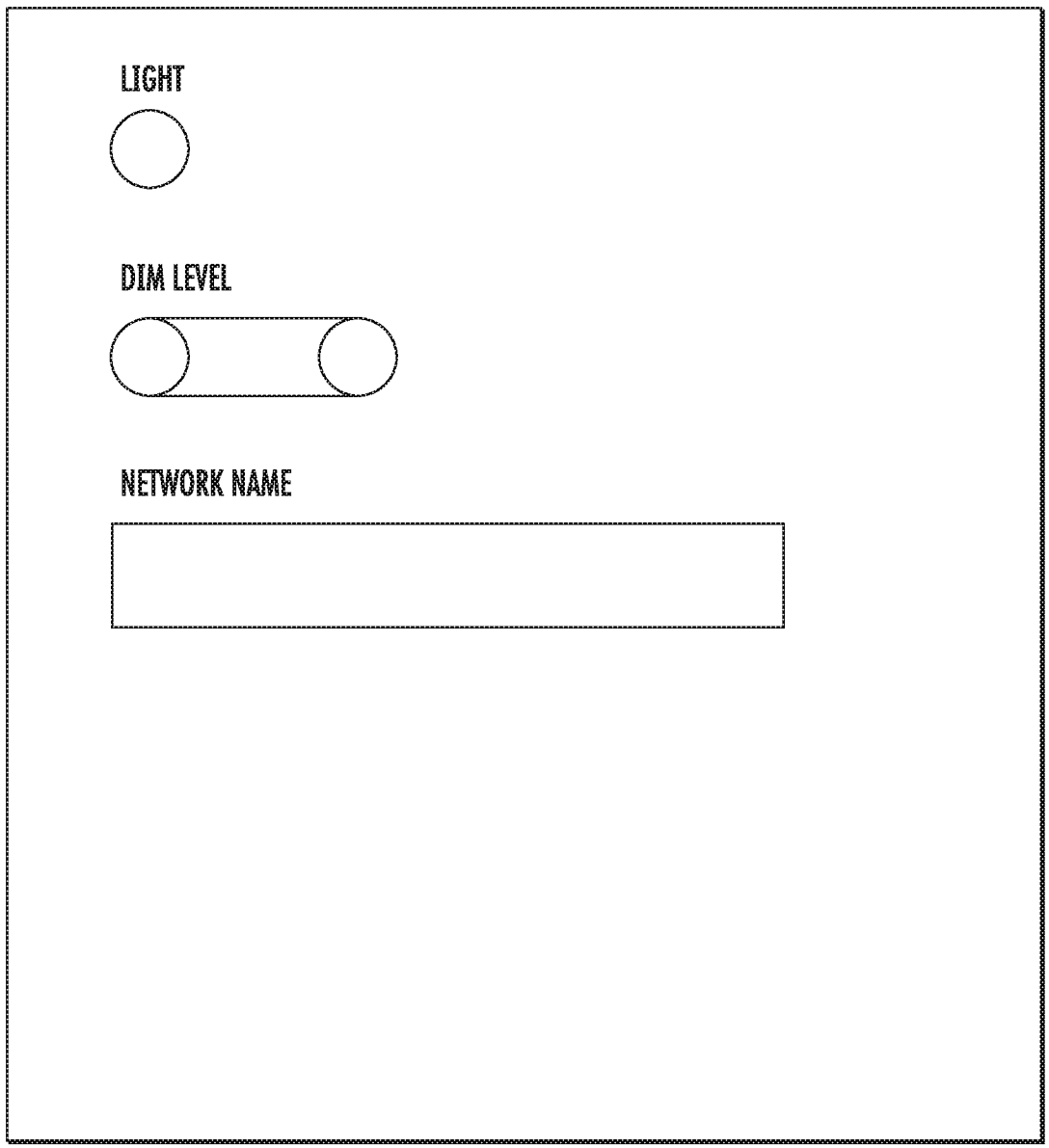
FIG. 6 shows the output as presented on the display of the companion device according to one embodiment.

As an example, in Box 420, the network device 100 may provide the following list of graphical descriptors to the companion device 10:

Button; on/off; Light; Command Light On; Command Light Off
Slider; 1; 100; 1; Dim Level; Command Dim Level
Input Box; 25; Network Name; Command Join Network In response, in Box 430, the Image Generator 310 of the companion device 10 may create the display as shown in FIG. 6.

At a later date, the companion device 10 may receive input from the user, as shown in Box 440. This input may include pressing the button, adjusting the slider, or typing in the input box. This input may be processed by the Interface Manager 320.

In response to this input, the companion device 10 performs an action. In certain embodiments, the companion device 10 determines which command it to be transmitted based on the input. For example, the Command Generator 330 may determine that the input was to turn on the button and transmits a command, such as "Turn Light On" to the network device 100, as shown in Box 450. As explained above, the command that it is to be transmitted is provided by the network device 100 in the graphical descriptor that was previously transmitted. Thus, the companion device 10 does not require any prior knowledge of the functionality of the network device 100, as the network device 100 provides the companion device 10 all of the required context.

Finally, as shown in Box 460, the network device 100 executes the command transmitted by the companion device 10.

Figure 7A:
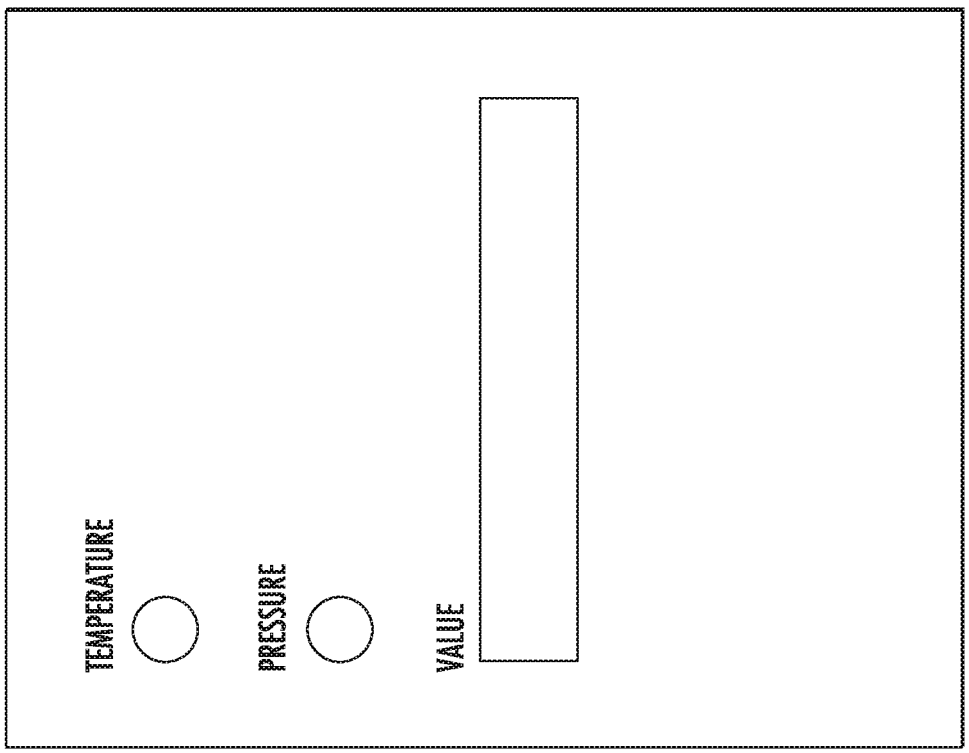
FIGS. 7A-7B show the output as presented on the display of the companion device for a list of graphical descriptors according to another embodiment.
Figure 7B:
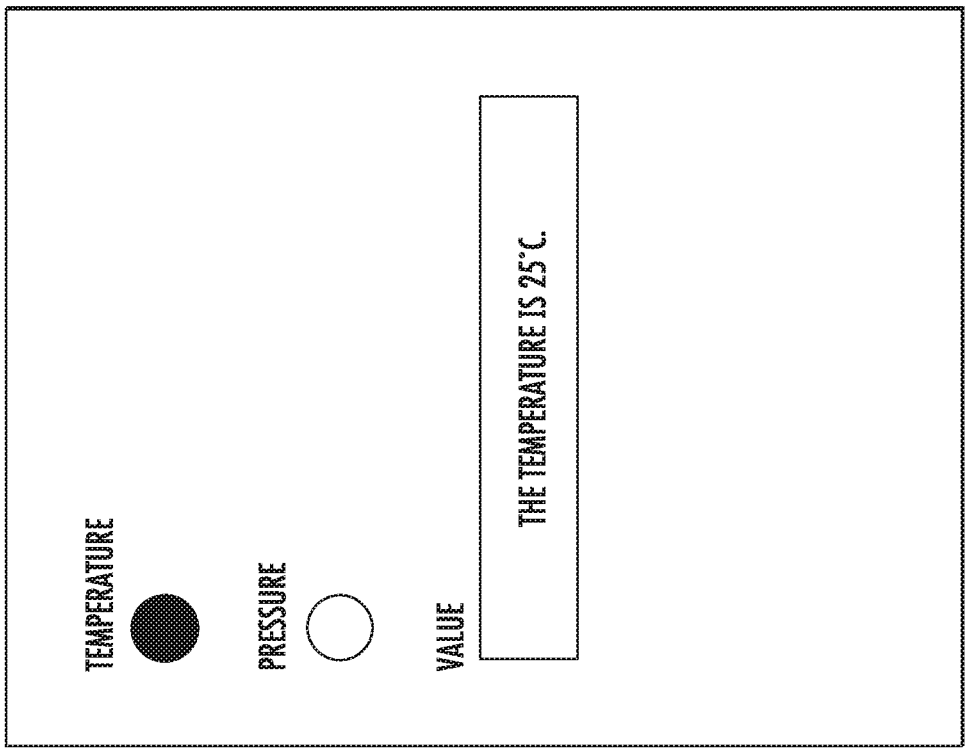

FIGS. 7A-7B show another embodiment that utilizes buttons and the display box. In this embodiment, the network device 100 may provide a list of graphical descriptors to the companion device 10 that includes the display box. The list may also include one or more buttons. In one embodiment, the buttons are used to indicate what is to be presented in the display box. In this particular embodiment, the network device may be a temperature and pressure sensor. During Box 420, the network device delivers a list of graphical descriptors as follows:

Button; on/off; Temperature; Command Temperature On; Command temperature Off
Button; on/off; Pressure; Command Pressure On; Command pressure off
Display box; 25; Value; " "

In response, the companion device 10 may create the screen shown in FIG. 7A. When the user then presses the button associated with temperature, the companion device 10 transmits a command to the network device 100 indicating that the temperature button was pressed. In response, the network device may then send another graphical descriptor to the companion device 10, which may be as follows:

Display box; 25; Value; "Temperature is 25° C.".

In other words, in this embodiment, the network device retransmits one of the graphical descriptors from the original list. The fact that this is a retransmission is clear because the same label is being used again. However, in this case, the graphical descriptor is supplied with a new data field, which is used to fill the display box. In response to this new entry, the companion device 10 now populates the display box, as shown in FIG. 7B.

In this embodiment, the network device 100 only retransmits the graphical descriptor for the display box. However, in other embodiments, the network device 100 may retransmit the entire list of graphical descriptors, with the change noted above.

Similarly, the companion device 10 may be used to display the output of a sensor 160 in graphical form. In one particular embodiment, the network device may be a temperature sensor. During Box 420, the network device delivers a list of graphical descriptors as follows:

Button; on/off; Temperature; Command Temperature On; Command temperature Off

Figure 8B:
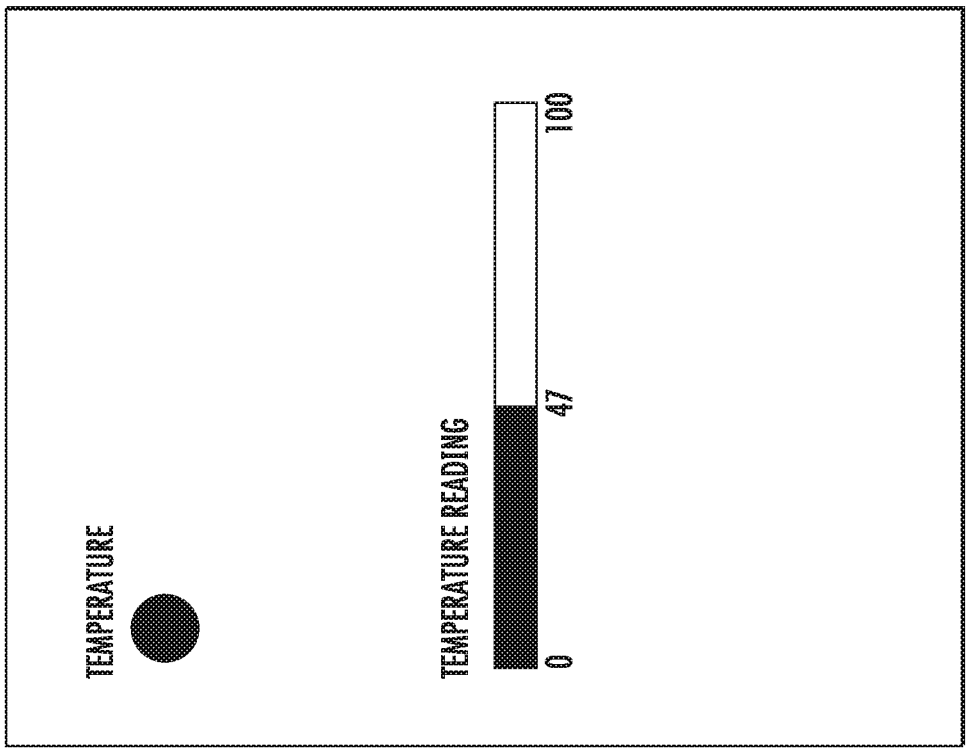
FIGS. 8A-8B show the output as presented on the display of the companion device for a list of graphical descriptors according to another embodiment.
Figure 8A:
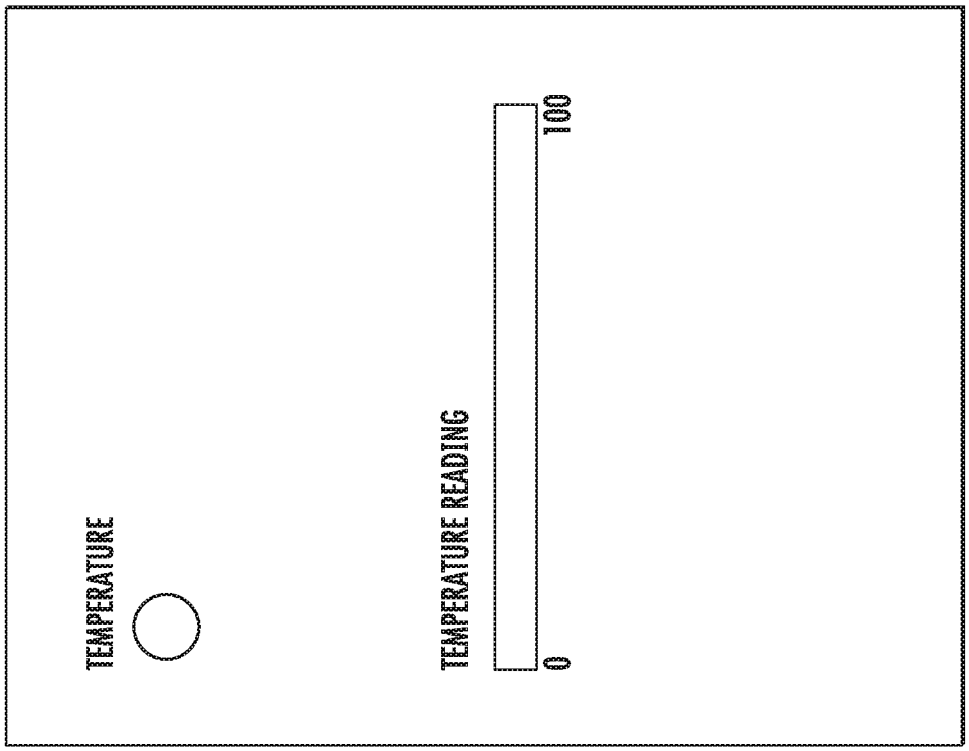

Gauge; 0; 100; 1; Temperature Reading;

In response, the companion device 10 may create the screen shown in FIG. 8A. When the user then presses the button associated with temperature, the companion device 10 transmits a command to the network device 100 indicating that the temperature button was pressed. In response, the network device may then send another graphical descriptor to the companion device 10, which may be as follows:

Gauge; 0; 100; 1; Temperature Reading; 47

In other words, in this embodiment, the network device retransmits one of the graphical descriptors from the original list. The fact that this is a retransmission is clear because the same label is being used again. However, in this case, the graphical descriptor is supplied with a new data field, which is used to fill the gauge. In response to this new entry, the companion device 10 now populates the gauge as shown in FIG. 8B.

Thus, through the use of a list of graphical descriptors, which employ standard graphical items, a companion device 10, with no knowledge of the function or operation of the network device 100, may serve as the user interface for this network device 100.

The sequence shown in FIG. 4 may be executed by the network device 100 using the second network interface 150, which may be a Bluetooth interface. This may be advantageous if the network device 100 is part of another wireless network, which may be its primary network, such as a ZIGBEE® or Z-Wave network. In this way, the actions of the companion device 10 do not interfere with the primary network activities. In another embodiment, the sequence shown in FIG. 4 may be executed by the network device 100 using the network interface 130.

Further, the above disclosure describes direct communications between the companion device 10 and the network device 100, such that the two devices interface directly with one another. However, other embodiments are also possible.

For example, FIG. 9 shows a gateway device 900 disposed between the network device 100 and the companion device 10. The gateway device 900 may have a first network interface 910 to interface with the network device 100 and other devices on that wireless network. The gateway device 900 may also have a second network interface 950 that may be in communication with a second network. In certain embodiments, the second network interface 950 may be accessible via the internet. Like the companion device 10 and the network device 100, the gateway device 900 also included a processing unit 920 and an associated memory device 925, which contains instructions, which when executed by the processing unit 920, enable the gateway to perform the functions described herein.

The network device 100 may use the network interface 130 to transmit the list of standard graphical items to the first network interface 910 of the gateway device 900. The gateway device 900 may then forward this list to the companion device 10, such as via the second network interface 930. For example, the gateway device 900 may have a connection to the internet, such that the companion device 10 may connect remotely to the gateway device 900 via an IP connection. Thus, the sequence shown in FIG. 4 is still implemented, but each transmission between the companion device 10 and the network device 100 also passes through the gateway device 900.

This system and method have many advantages. As these wireless network devices get smaller, the ability to include any user interface (screen, switches, jumpers, etc.) is increasingly difficult. Further, the complexity of these network devices is increasing. Therefore, currently it is difficult to preconfigure these network devices. The ability to utilize a companion device, which may be a tablet or smart phone, allows configuration of the wireless device. Thus, configuration parameters may be easily entered into the network device. Additionally, several standard graphical items allow the network device to provide data to the companion device. This may facilitate the debug of the network device or of the network. Further, by defining a plurality of standard graphical items, the software program of the companion device only needs to be able to generate these graphical images. No other special functionality is requested. Further, in addition to utilizing standard graphical items, the network device also instructs the companion device of actions to take upon activation of any of these graphical items. Therefore, the companion device 10 does not need to have any prior knowledge of the operation or functionality of the network device.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for using a companion device to serve as a user interface for a network device, comprising:
transmitting, from the network device to the companion device, a list of graphical descriptors, wherein each graphical descriptor includes a field that denotes a standard graphical item and a set of parameters associated with the standard graphical item, wherein at least one of the standard graphical items is a button having a first position and a second position which is used to provide data to the network device, and for the button, one or more parameters of the set of parameters comprises a first command that the companion device is to issue to the network device if the button is actuated in the first position, and a second command that the companion device is to issue to the network device if the button is actuated in the second position;
displaying the standard graphical items on a display element on the companion device, wherein a software program used to display the standard graphical item is preloaded in the companion device;
accepting user input at the companion device, wherein the user input comprises actuating the button; and
issuing a command to the network device in response to the user input, wherein the command is either the first command or the second command.

2. The method of claim 1, wherein the standard graphical items are button, slider, input box, display box and gauge.

3. The method of claim 1, wherein one or more parameters of the set of parameters provide information regarding how the standard graphical item is to be displayed by the companion device.

4. The method of claim 1, wherein at least one of the standard graphical items is used to provide data to a user, and one or more parameters of the set of parameters comprises data that the companion device is to display on the display element.

5. The method of claim 1, wherein a gateway device is disposed between the network device and the companion device such that all communications between the companion device and the network device pass through the gateway device.

6. A companion device for use with a network device to serve as a user interface for the network device, comprising:
- a network interface;
- a display element;
- an input device;
- a processing unit; and
- a memory device in communication with the processing unit, comprising instructions, which when executed by the processing unit, enable the companion device to:
  - receive a list of graphical descriptors from a network device, wherein each graphical descriptor includes a field that denotes a standard graphical item and a set of parameters associated with the standard graphical item, wherein at least one of the standard graphical items is a button having a first position and a second position and which is used to provide data to the network device, and for the button, one or more parameters of the set of parameters comprises a first command that the companion device is to issue to the network device if the button is actuated in the first position, and a second command that the companion device is to issue to the network device if the button is actuated in the second position;
  - display the standard graphical items on the display element;
  - receive user input in response to the standard graphical items, wherein the user input comprises actuating the button; and
  - issue a command to the network device in response to the user input, wherein the command is either the first command or the second command.

7. The companion device of claim 6, wherein the standard graphical items are button, slider, input box, display box and gauge.

8. The companion device of claim 6, wherein one or more parameters of the set of parameters provide information regarding how the standard graphical item is to be displayed on the display element by the companion device.

9. The companion device of claim 6, wherein at least one of the standard graphical items is used to provide data to a user, and one or more parameters of the set of parameters comprises data that the companion device is to display on the display element.

10. A network device for use with a companion device that serves as a user interface for the network device, comprising:
- a network interface;
- a processing unit; and
- a memory device in communication with the processing unit, comprising instructions, which when executed by the processing unit, enable the network device to:
  - transmit a list of graphical descriptors to the companion device, wherein each graphical descriptor includes a field that denotes a standard graphical item and a set of parameters associated with the standard graphical item and wherein the companion device displays the standard graphical items on a display element such that user input may be entered, wherein at least one of the standard graphical items is a button having a first position and a second position which is used to provide data to the network device, and for the button, one or more parameters of the set of parameters comprises a first command that the companion device is to issue to the network device if the button is actuated in the first position, and a second command that the companion device is to issue to the network device if the button is actuated in the second position; and
  - receive a command from the companion device based on the user input, wherein the command was either the first command or the second command.

11. The network device of claim 10, wherein the standard graphical items are button, slider, input box, display box and gauge.

12. The network device of claim 10, wherein one or more parameters of the set of parameters provide information regarding how the standard graphical item is to be displayed on the display element by the companion device.

13. The network device of claim 10, wherein at least one of the standard graphical items is used to provide data to a user, and one or more parameters of the set of parameters comprises data that the companion device is to display on the display element.

14. The method of claim 1, further comprising:
- transmitting, from the network device, an inquiry seeking a device to serve as its user interface; and
- transmitting, from the companion device, in response to the inquiry, an indication of its ability to serve as the user interface for the network device.

15. The method of claim 1, further comprising:
- transmitting, from the companion device, an indication of its ability to serve as the user interface for the network device; and
- transmitting, from the network device, in response to the indication, a response that it is seeking a device to serve as its user interface.

16. The method of claim 1, wherein the button is a push button or a toggle switch.

* * * * *